E. W. Goodale.

Paper Bag Mach.

No. 1,170 Reissued April 16. 1861

Witnesses:

J. W. Coombs

R. S. Spencer

Inventor:

E. W. Goodale per Munn & Co

Attorneys

E. W. Goodale.

Paper Bag Mach.

No. 1170

Reissued Apl. 16. 1861.

Witnesses:

J. W. Coombs

R. S. Spencer

Inventor:

E. W. Goodale per Munn & Co

Attorneys

E. W. Goodale.
Paper Bag Mach.

No. 1,170

Reissued Apl. 16. 1861.

Witnesses:

J. W. Coombs
R. S. Spencer

Inventor:

E. W. Goodale
per Munn & Co.
Attorneys

E. W. Goodale

Paper Bag Mach.

Additional Drawing.

Filed Oct 8. 1860.

No. 4170.

Reissued Apl. 16. 1861.

Witnesses:

Geo Combs.
R. S. Spencer

Inventor:

E. W. Goodale
per Munn & Co
Attorneys

UNITED STATES PATENT OFFICE.

E. W. GOODALE, OF CLINTON, MASSACHUSETTS.

IMPROVEMENT IN MACHINES FOR MAKING ENVELOPES.

Specification forming part of Letters-Patent No. 13,647, dated October 9, 1855; Reissue No. 1,170, dated April 16, 1861.

*To all whom it may concern:*

Be it known that I, E. W. GOODALE, of Clinton, in the county of Worcester and State of Massachusetts, have invented certain new and useful Improvements in Machinery for Making Envelopes or Bags of Paper or other Material; and I do hereby declare that the following is a full, clear, and exact description of the same, reference being had to the accompanying drawings, forming part of this specification, in which—

Figure 1:
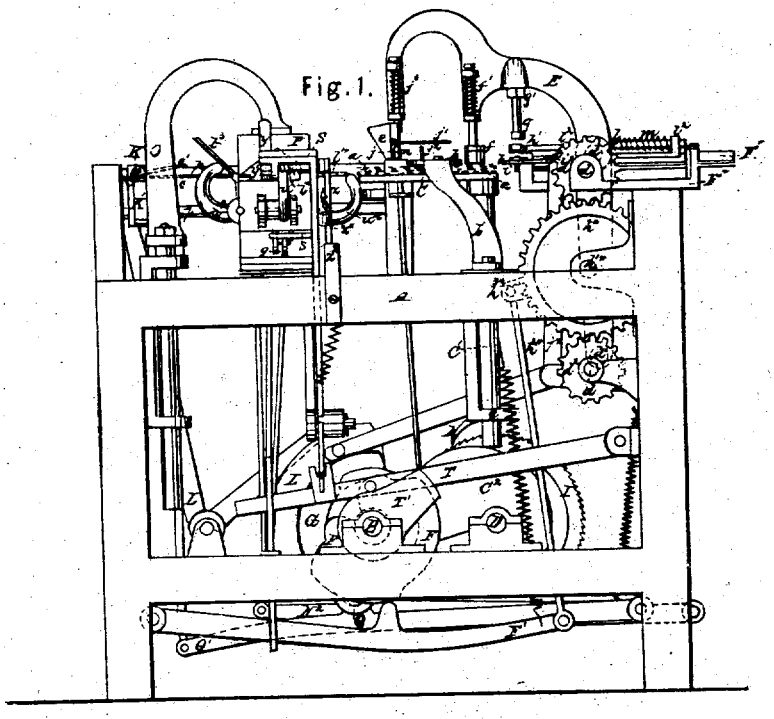
Figure 2:
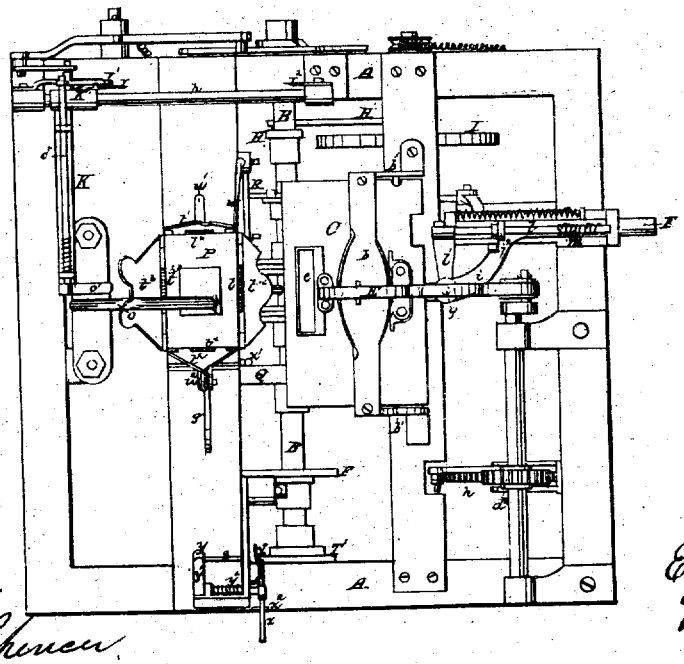
Figure 3:
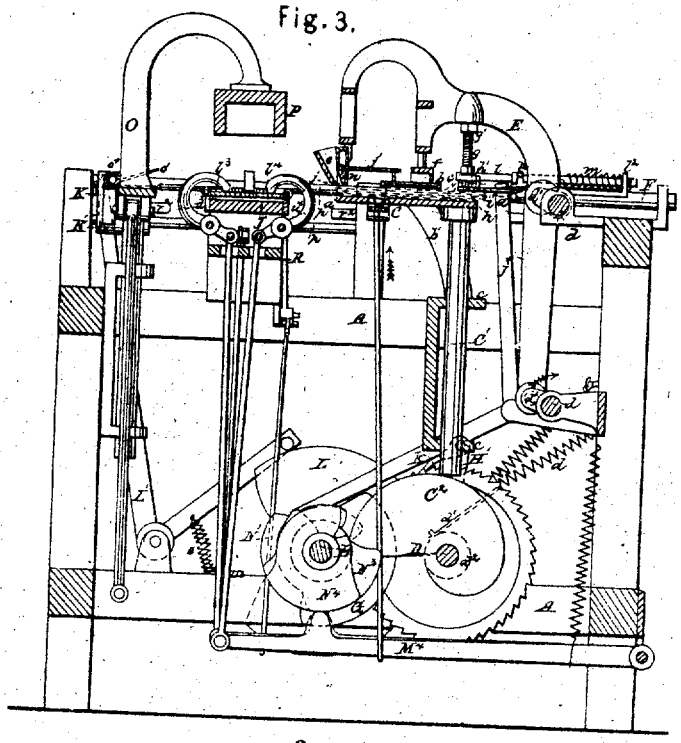
Figure 4:
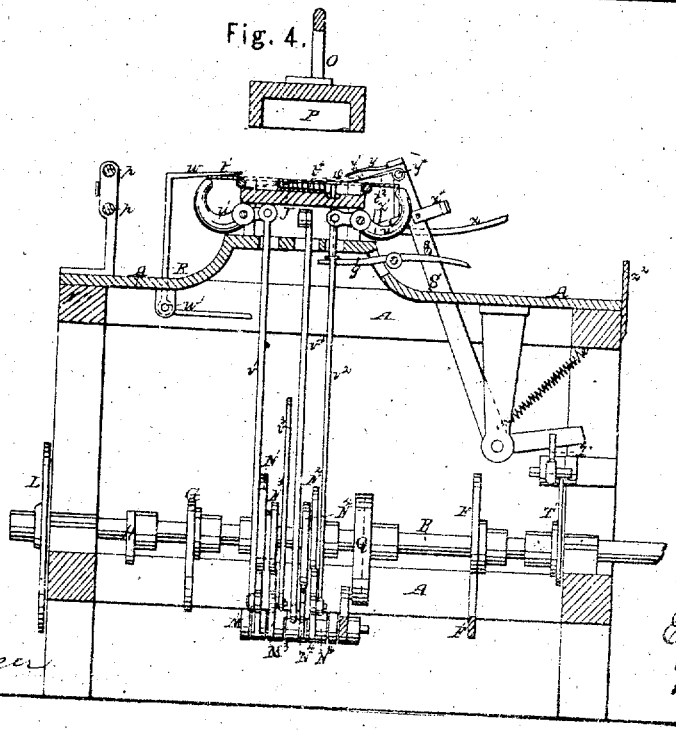
Figure 5:
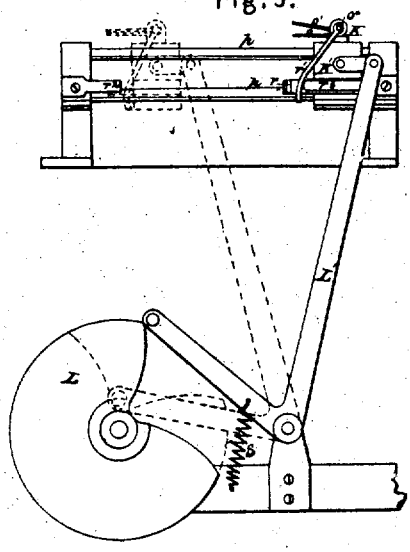
Figure 8:
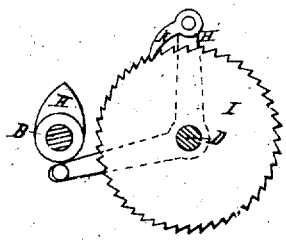
Figure 6:
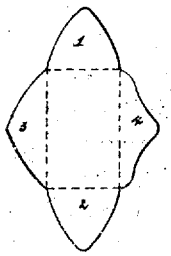
Figure 7:
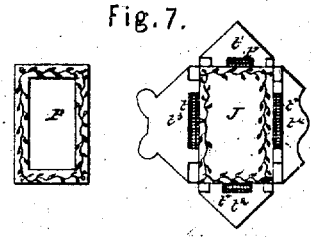

Figure 1 is a side elevation of an envelope-machine constructed according to my invention. Fig. 2 is a plan of the same. Fig. 3 is a central longitudinal vertical section of the same. Fig. 4 is a transverse vertical section of the same in the line * * of Fig. 1. Fig. 5 is a side view of a portion of the machine, seen looking in the opposite direction to Fig. 1. Fig. 6 shows an envelope-blank unfolded. Fig. 7 shows the face of the folding-stand and the plunger P. Fig. 8 exhibits a detail view of a portion of the machine. Figs. 9, 10, 11, and 12 illustrate the manufacture of a bag by the machine.

Similar letters of reference indicate corresponding parts in the several figures.

My invention consists in certain novel devices and novel combinations and arrangements of known devices, the whole combining to constitute a machine of novel character by which a piece of paper of proper form may be made into a perfect envelope or bag, and which by the addition of a curved knife, such as is described for cutting the paper from the roll in the original specification of my Letters Patent for improvement in machinery for making bags, dated May 29, 1855, and in the amended specification of the reissue of said Letters Patent, dated September 4, 1860, and some mere modifications of its parts, may be made to cut paper from a roll, paste it, and form it, without any waste whatever, into bags.

My invention also consists in so cutting and folding the paper as to make the bags complete, without any waste, with one side of the mouth projecting beyond the other in such a manner as to afford facility for opening the bag and to form a lap for closing the mouth.

To enable others to make and use my invention, I will proceed first to describe the construction and operation of the machine for making envelopes represented in Figs. 1, 2, 3, 4, 5, 7, and 8 of the drawings, and afterward explain the additions and modifications necessary to make bags from a roll of paper without waste.

A A is the frame-work of the machine.

B is the main shaft, which carries a number of cams, by which motion is given to the different working parts of the machine.

C is a table, which carries a pile of blanks, *a a*, Figs. 1 and 3, from which the envelopes are to be formed, the said blanks being supposed to be cut to the proper form before being introduced into the machine. The table C is attached to an upright shaft, C′, which works in proper guides, *e e*, and rests on a scroll-cam, $C^2$, upon a horizontal shaft, D, which is parallel with and near to the main shaft B. This shaft D has not a complete rotary motion, but only turns far enough to enable the cam $C^2$ to raise the table C up to bring the top blank of the pile *a a*, which is shown by red lines in Figs. 1 and 3, in contact with the under side of the gluten-dish *b*, which is supported above the table by two standards, *b′ b′*, which stand one on each side of the table, the said shaft being operated upon for the above purpose by a spring, *d*, applied to a cord, *d′*, which winds partly round a pulley, $d^2$, (shown dotted in Fig. 3,) which is fast on one end of the said shaft.

The action of the above spring and cord is such as to make it turn the shaft D to bring the rising part of the cam in operation and raise the shaft C′ of the table, and the effect is to press the paper upward toward or against the bottom of the dish *b*, so that when one sheet has been removed another is brought to the same level. The several blanks while upon or above table C are submitted to three distinct operations—viz., the pasting for the purpose of uniting the three flaps which form the back of the envelope, the application of the gluten to the remaining flap, or, as it is termed, the "seal-flap," to make the envelope to make it self-sealing, and the stamping the seal-flap.

E is a curved head of metal, standing partly over the table C, and having attached to it the paste-box *e*, which carries the paste to stick together the three first-named flaps of the envelope, the gluten-die $f$, which takes gluten from the gluten-dish $b$ and puts it on the seal-flap, and a screw, $g$, which gives pressure to the stamp which stamps the seal on the seal flap. The head E is carried by two cranks, $d'$ $d'$, of equal length, on two horizontal shafts, $d$ $d$, which are placed one above the other, parallel with the shafts B and D. These shafts $d$ $d$ are geared together, so as to move always in the same direction by means of a spur-wheel, $d^2$, on each, gearing with a spur-wheel, $h^*$, which is fitted to turn easily on a fixed axle, $h^{2*}$. This wheel $h^*$ carries an arm, $h^{3*}$, which is connected by a rod, $h^{2*}$, with a lever, F′, which is operated upon by a cam, F, on the main shaft, to draw down the arm $h^{3*}$ and give the wheel $h^*$ about one-sixth of a revolution, thereby giving nearly one-third of a revolution to the shafts $d$ $d$ and their cranks in the direction of the arrows shown near them in Fig. 3, to carry the head E from the position shown in Fig. 3, where the gluten-die $f$ is in the gluten-dish $b$, to that shown in Fig. 1, where the gluten-die rests on the top sheet of the pile of blanks, the head being returned again by the action of a spring, $i$, which holds the lever up in contact with the cam.

The paste-box $e$ is attached to the front part of the head E. It is of angular or V form in its transverse section, as shown in Fig. 3, the apex of the V being at the bottom. Its horizontal form should correspond with the line in which the paste is laid upon the blank. For instance, if the envelope-blank were of the form represented in Fig. 6 the horizontal form of the trough would require to correspond with the margin of the flap 3, which is the only part requiring to be pasted.

As the horizontal form of the box requires to be varied to suit the envelope, I have for convenience' sake represented it as being straight. The bottom of the box is closed, except at the proper time to apply the paste, by means of a spring-flap or swing-valve, $j$, (see Fig. 1,) but at the proper time for applying the paste the said flap is opened by a lever, $j'$, attached to the said valve, striking a small stand, $j^2$, which is attached to the gluten trough $b$. When the opening occurs, the bottom of the paste-box is in contact with the paper, and pressing lightly upon it, the pressure being made yielding by springs $j^3$, applied to the trough. The gluten-die is attached to the head E behind the paste-box. It consists of a solid piece of metal, wood, or other suitable material, faced, if necessary, with cloth or leather, its face corresponding in form with the margin of the seal-flap. (See 4, Fig. 6.) Like the paste-box it is arranged to press upon the paper with a yielding pressure by means of springs $j'$. The screw $g$, by which pressure is given to the seal flap stamp, is behind the gluten-die, and is screwed into the head and secured by a jam-nut, $g'$. The seal-flap stamp consists of two dies, $h$ $h'$, of which the former, having a hard-steel face containing the reverse impression to stamp the seal outside of the seal-flap, is at the bottom, and the latter, containing the obverse impression and having a soft-metal plate, is at the top. The die $h$ is attached to an arm, $i$, which is secured to a slider, F*, arranged to slide in suitable fixed guides, F′*, and which receives a movement back and forth by means of an elbow-lever, $j^*$, operated upon by a cam, G, on the main shaft B, and a spring, $j'^*$, connecting the said slider with one of its guides. At the front extremity of the arm $i$ there is a wedge-shaped piece, $i'$, standing in front of the die, the duty of which is to pass under the top envelope-blank on the pile to make room for the die $h$ to get under, the said top blank being at the time of the entrance of the said wedge below it raised a little by the gluten-die as the latter commences rising after putting on the gluten, and the table with the remainder of the pile of blanks being at the same time lowered a little by the action of a small cam, H, (see Fig. 8,) on the main shaft B, upon an elbow-lever, H′, which is fitted loosely to the shaft D, and which carries a pawl, $k$, which engages with a ratchet-wheel, I, which is fast on the shaft D. By the action of this cam the lower arm of the elbow-lever H′ is depressed, and the upper arm thrown forward for its pawl to turn the ratchet-wheel and shaft D, and the cam $C^2$, a short distance in the proper direction for the upright shaft C′ to descend the cam and carry down the table and the pile of blanks. The table C and the pile of blanks are raised again after the prominent part of the cam H passes the elbow-lever by the action of the spring $d$, cord $d'$, and pulley $d''$, before described. The combination of the ratchet-wheel and the elbow-lever and pawl allows of a greater or less movement being given by the cam H to the cam $C^2$. The top die, $h'$, is attached to an arm, $l'$, which is carried by a small spindle, $l$, working in bearings $l^2$ $l^2$, attached to the slider F*, the said spindle having a spring, $m$, coiled round it to keep the die $h'$ a little raised from $h$, except during the stamping operation.

As the operations of those parts of the machine whose construction has been thus far described are all intimately related, it may be well to describe them, and to show the state to which they bring the process of making the envelope, before proceeding with the description of the construction of the other parts of the machine. I will first suppose the machine to be in the condition represented in Fig. 3. The top blank of the pile is at that time receiving the paste and having its seal-flap stamped by the dies $h$ $h'$, and the gluten-die $f$ is charging itself with gluten from the dish $b$, ready for applying the gluten to the next blank. As the movement of the head E commences in a backward direction or toward the position shown in Fig. 3, the top blank is removed by a pair of nippers, $o$ $o'$, hereinafter to be described, the said blank being released from the stamping-dies $h$ $h'$ by the spring $m$, raising the upper die, $h'$, as soon as the screw $g$ leaves it. The gluten-die, charged with gluten, is carried back by the head E until it is deposited upon the blank, which is now at the top of the pile. As soon as the gluten-die has been pressed onto the blank the movement of the cam $C^2$, by means of the ratchet-motion on its shaft, takes place, and the table C, with all the pile of blanks except the top one, descends, leaving the top blank sticking to the gluten-die. Just at this moment the forward movement of the head E takes place, and the dies $h$ $h'$ are brought forward by the movement of the slider F. Owing to the attachment of the head E to cranks, the first part of its movement is in an upward direction, and after this upward movement commences the wedge-shaped extremity $i'$ of the arm $i$, carrying the lower die, $h$, enters between the top blank and the remainder of the pile, and is followed by the die $h'$. When the head E has moved a short distance, the blank, being arrested in its upward movement by striking the gluten-dish $b$, becomes detached from the gluten-die, but not before the dies $h$ $h'$ have received the point of the seal-flap, or the part which is to receive the stamp, between them, the said dies still remaining open. The forward motion of the head E continues, leaving the lower arm, $i$, which carries the lower die, $h$, resting on the pile of blanks. Just before the forward movement of the head E terminates, the lever $j'$ strikes the stand $j^2$ and opens the spring valve $j$ of the paste trough to supply the paste necessary to stick the laps 1, 2, and 3 (see Fig. 6) together. The latter part of the forward movement of the head being in a downward direction brings the screw $g$ down upon the upper die, $h'$, and gives the pressure necessary to stamp the seal-flap. It at the same time brings down upon the paper the edge of a thin plate or creaser, $n$, which is attached to and parallel with the paste-box, and creases the paper near the edge where it is pasted, to make it stick better. When the head E returns again, the spring-valve of the paste-box closes as soon as the lever $j'$ clears the stand $j^2$. During the return of the head E the nippers $o$ $o'$ come into operation to remove the top blank to the folding-stand J, which is placed a short distance in advance of the table C. The lower jaw, $o$, of these nippers is attached rigidly to a horizontal bar, K, which occupies a transverse position in the machine and is attached to a slider, K', (shown best in Fig. 5,) which is fitted to slide on two horizontal bars, $p$ $p$, secured to standards erected on one side of the frame-work A. The upper jaw, $o'$, is attached to a spindle, $o^*$, which is fitted to turn freely in bearings secured to the bar K, and it has a coiled spring, $q$, applied to it in such a manner as to turn it in a direction to depress the jaw and close the nippers when the upper jaw is not held up through the agency of a spring-catch, $r$, which is attached to the slider K' and made to arrest a lever, $r'$, attached to the spindle $o^*$, during the whole time the nippers are intended to be held open. The nippers are caused to be opened and closed by the movement back and forth which they receive for the purpose of carrying the blank. The nippers go backward, open to receive the blank, and at the end of their movement in that direction are closed by the release of the lever $r'$ from the spring catch $r$, the said release being effected by the said catch being thrown inward by passing inside a fixed inclined guide-piece, $r^2$. After the nippers have advanced with the blank far enough to place it on the folding-stand J, the lever $r'$ comes in contact with a fixed stop, $r^3$, and the concluding portion of the movement of the slider K' throws back the lever $r'$ till it is caught by the catch $r$, which holds it open during the next backward movement. The movement of the slider K', which carries the nippers, is effected in proper time by its being connected by a link with the longer arm of an elbow-lever, L', the shorter arm of which carries a pin which bears on the periphery of a cam, L, on the main shaft B, the said pin being kept always in contact with the cam by a spring or springs, $s$ $s$.

The folding-stand J, upon which the folding of the envelope or bag is performed, is a table of metal of the same size and form as the finished bag or envelope is intended to be. Attached to the four sides of this stand are hinged four lappers, $t'$, $t^2$, $t^3$, and $t^4$, which are substantially similar to what are termed the "side lappers" in the paper-bag machine for which Letters Patent were granted to me bearing date May 29, 1855, which Letters Patent were reissued September 4, 1860; and these lappers are operated in a somewhat similar manner to crease and fold the envelopes by means of bent levers $w'$ $w^2$ $w^3$ $w^4$, pivoted to the stand J, and rods $v'$ $v^2$ $v^3$ $v^4$, connecting the said levers with long levers $M'$ $M^2$ $M^3$ $M^4$, operated upon by cams $N'$ $N^2$ $N^3$ $N^4$ on the main shaft B. The lappers are thrown back after the creasing and folding operations by springs $t^*$, applied to their hinges. Above the folding-stand is a block or plunger, P, of the same size as the stand. This plunger is attached to a sliding head, $o$, which works on suitable vertical guides attached to the frame-work A of the machine, and receives a vertical motion by being connected with a lever, Q', which is operated upon by a cam, Q, on the main shaft. At the time the blank is laid upon the folding-stand the lappers are all thrown open or apart, and occupy a horizontal position, standing a distance above the stand J equal to the thickness of the joint of the hinge. The blank is received upon these folders, and immediately after the plunger P descends and carries the central portion of the blank, which is to form the front of the envelope, down between the hinges of the lappers, the said hinges forming as it were the sides of a female die. As soon as the plunger has descended, the lappers $t^1$ $t^2$ $t^3$ rise simultaneously to a nearly vertical position and thus crease the three laps 1 2 3 of the envelope in the line in which they are to be folded. After that has been done, the plunger rises, when the three lappers, aforesaid, without going back, fall over, one at a time in turn, as they are numbered, to the position shown dotted in Fig. 4, and fold down the three flaps, being also followed by the lap $t^4$, which folds the seal-flap. The glutton, which is applied to the seal-flap, is of such a nature as to dry quickly, and, having been applied earlier than the paste, becomes dry before the folding operation, so that it does not stick, while the paste remains wet to stick the three flaps $l^1$ $l^2$ $l^3$ together. The seal-flap receives no preparatory creasing operation like the other three flaps, and as when the folding operation takes place the plunger P is raised, something else is necessary to crease the paper in the proper line, and for this purpose I employ two creasers, *w*, only one of which is shown in the drawings, (see Figs. 2 and 4,) arranged one at each side of the stand. These creasers consist each of a finger, *w*, attached to one of two bent levers, R, which are arranged to work transversely of the machine on a fixed pivot, *w'*. These levers are connected with and operated by the lever M', by which the lapper *t'* is operated to throw the fingers *w* down upon the envelope at the time the lapper $t^1$ commences to operate. After the folding is completed, the lappers, being released by their respective cams, are suddenly thrown back, or opened by the springs $t^*$ in their hinges, leaving the finished envelope free to be lifted up and removed by a pair of nippers, *y y'*, arranged for that purpose, as shown in Figs. 4, 2, and 1. The upper jaw, *y*, of the nippers *y y'*, (shown best in Fig. 4,) is attached to the horizontally-bent end of a vertically-vibrating elbow-lever, S. The lower jaw is attached to the upper jaw in a manner similar to that in which the upper jaw of the nippers *o o'* is attached to the lower jaw, being secured to a spindle, $y^*$, having a coiled spring applied to close it, and a lever, 2, to be caught by a spring-catch, $z^*$, (best shown in Fig. 1,) attached to the lever S for the purpose of holding it open. The opening and closing of the nippers is governed by the movement back and forth which they receive for the purpose of taking away the envelopes. They move open toward the stand, and as soon as they have received the envelope between them the spring-catch comes in contact with a fixed disengaging-piece, *z'*, attached to the frame-work of the machine, and is thereby thrown aside to liberate the lever *z*, by which they have been held open. Returning with the envelope, they remain closed until the lever *z* strikes a fixed stop-piece, $z^2$, and is thereby arrested until, by the continued movement of the nippers, it has been caused to open the nippers and been caught by the catch $z^*$. When the nippers open, the envelope may be taken away by hand or allowed to drop out into a suitable receptacle. The movement of the elbow-lever S to carry the nippers back and forth is effected by a long lever, T', upon which the lower arm of the elbow-lever rests, and a cam, T, on the main shaft B.

The lifting up of the envelope from the folding-stand, as shown in Fig. 4, where the envelope is shown in red color, high enough to be caught by the nippers *y y'*, which pass above the open lapper $t^2$, is effected by means of a small lifter, 10, which works through the stand J, near the end next the nippers. This lifter at all times, except when it is required to raise the envelope, is flush with the face of the stand; but while the nippers are moving forward it is raised by a stud, 8, on one side of the lever S, striking down one arm of a small lever, 9, (see Fig. 4,) the other arm of which stands below the bottom of the said lifter.

The relation between the movements of the creasing and folding devices and the nippers *y y'* and those of the devices for pasting, applying the gluten, and stamping, and the nippers *o o'*, is such that one envelope is undergoing the process of creasing and folding on the stand J while a blank is being pasted, stamped, &c., on or above the table C, and the nippers *o o'* and *y y'* operate almost simultaneously, those *y y'* being a little the quickest, so as to remove the folded envelope from the stand J before the next blank is placed there.

The embossing of the envelope, when it is desired, may be performed during the manufacture by having the faces of the folding-stand J and plunger P suitably engraved or otherwise prepared to produce the required impression. Whenth is is intended, it will be well to have the stand J and the plunger P heated by steam.

Instead of the spring-flap at the bottom of the paste-box a roller might be employed, carrying a ratchet-wheel, which would be operated upon by a pawl carried by a lever arranged substantially in the position of *j'*, and operated upon by coming in contact with a stand, $j^2$, in the gluten-trough.

It is obvious that a machine which makes envelopes will require but slight modification to enable it to make bags from blanks or pieces of paper which have been prepared for it by cutting to a proper shape. The only essential difference between an envelope and a bag is in the form of the laps, and hence the modification necessary to make a bag from cut blanks will consist in suitable changes in the form of the lappers and the pasting apparatus to suit the forms of the bag-laps, and in a machine for making bags the seal stamp *h h'* can be dispensed with, as there is no necessity for it. I prefer, however, in making bags to supply the paper to the machine from a continuous roll, and cut it into pieces of proper form and shape by a cutter or shears attached to the machine; but this cannot be so well done in making envelopes, owing to the difficulty of cutting the latter to a suitable form by such cutters as can be conveniently applied in such a machine.

In adapting the machine to the manufacture of bags from the roll of paper, the roller on which the paper has been rolled up will have its journals arranged in suitable fixed bearings at the end toward the right hand of Figs. 1 and 3, and the head E would require either to be bent or so arranged as to allow the paper to pass on one side of it as it is fed to the table C by the feed-rollers. The pieces to form the bags will be cut from the roll to a proper form to make them without any waste, each by a single cut made by curved shears, such as are described for the purpose of cutting the paper from the roll in the specification of my Letters Patent for improvements in machinery for making bags, dated May 29, 1855, and in the specification of the reissue of said Letters Patent, dated September 4, 1860, said shears being arranged between the pasting-table C and the folding stand J. A sufficient length of paper to form the bag will be delivered from the roll on the able C to be pasted and afterward delivered on the folding stand, to be first cut off and then folded, such delivery being effected by the nippers *o o'*, operating substantially as before described—that is to say, seizing the end of the paper after the pasting operation has been performed upon the table C, and drawing it over the folding-stand, measuring and drawing from the roll at each operation the exact quantity necessary to make a bag. The paper in the roll must be of a width equal to twice the intended witdh of the bag, with the addition of the necessary width to form a pasted seam. The bag is made by precisely the same system of folding hereinbefore described as being used for the envelopes, except that the flap which is left to cover the mouth does not require to be folded, and hence the lapper *t'* is omitted from the machine.

Figure 9:
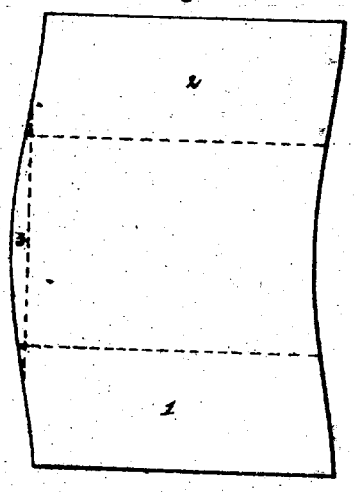
Figure 10:
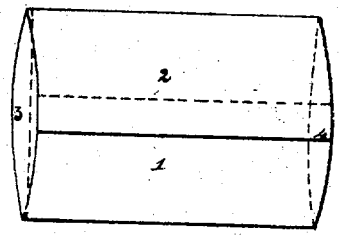
Figure 12:
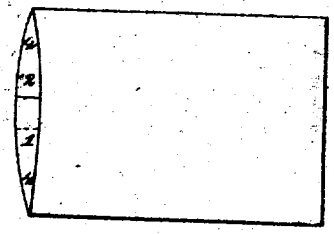
Figure 11:
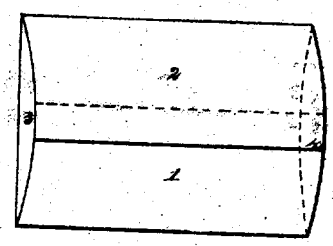

The form to which the blank is cut by the curved shears and the manner in which it is folded are illustrated in Figs. 9, 10, 12, and 12. Fig. 9 represents the blank having marked upon it in dots the lines where it is to be folded. Fig. 10 represents the bag with the two side laps, 1 and 2, folded, but the bottom lap, 3, not yet folded; and Figs. 11 and 12 represent opposite sides of the completed bag. The two curved edges of the blank are produced by the form of the curved shears, which cut it from the roll, and the two straight edges are parts of the margins of the roll. The laps 1 2 3 correspond, except in their form, with the similarly-numbered laps of the envelope-blank shown in Fig. 6, and are folded over, one at a time, by their respective lappers, in the order in which they are numbered; and the paste having been laid along the upper margins of the laps 2 and 3 before they were folded causes the bag to be completed by the folding operation. The bottom lap, 3, which is shown in Fig. 10 as not yet folded over to close the bottom of the bag, is produced without waste of material by the form of the cut made by the curved shears in cutting the paper from the roll, and so is the projection or flap 4, which provides for the convenient opening of the mouth, and which also serves to close up the bag, and, in fact, the bag is made complete without any waste of paper. When complete, the bag has a seam, 5, up one side, a curved seam, 6, along the bottom. Each bag may have a merchant's card or other inscription printed on it by a stamp, V, arranged, as shown in Fig. 3, to work through the table C, and operated for that purpose by one of the cam-levers of the machine. This stamp may be inked by any suitable means.

What I claim as my invention, and desire to secure by Letters Patent, is—

1. The employment, in a machine for making envelopes or bags, to support the blanks during either or all of the operations of pasting, stamping, and applying the gluten, of a self-adjusting table, C, supported by a cam whose position is so controlled by a spring or its equivalent, applied to its shaft, that, as the blanks are removed one by one the table is caused to rise to bring the next one to the proper height or position to be pasted, stamped, or have the gluten applied, substantially as herein set forth.

2. Giving the self-adjusting table a drop movement, substantially as described, by means of the cam H, the lever H', pawl *k*, ratchet-wheel I, or their equivalents, acting on the shaft of the supporting-cam $C^2$.

3. Applying the gluten, which makes the envelope or bag self-sealing, to that part of the blank which is to form the seal-flap or closing-flap of the envelope or bag by a die, while in the machine at the commencement of the process, substantially as herein described, whereby the said die serves the two purposes of applying the gluten and of lifting the blanks, one at a time, from the pile, or retaining the top one while the remainder of the pile is lowered away from it.

4. Applying the two dies *h h'* to two arms or jaws, *i l*, which are connected together by a hinge, or its equivalent, arranged at the rear of the table C, and which have a sliding motion back and forth, substantially as described, to move the said dies out of the way of every successive blank till the latter has had the gluten applied and been separated from the pile, and then to bring them forward again to receive the separated blank and to receive the pressure of the screw *g*, or its equivalent.

5. Attaching the paste-box, the gluten-die, and the screw *g*, or other equivalent device, which gives pressure to the stamp which produces the seal, to a head, E, receiving such a motion as is herein described from a pair of cranks, or their equivalents.

6. The employment of a pair of nippers, *o o'*, having a motion of a positive length in the line, or parallel with the line, in which the blank is required to move from the pasting to the folding apparatus either to take a cut blank from a table or to draw the material before it is cut from a roll, and measure off the proper length to be cut, substantially as herein set forth.

7. The method of giving the necessary movements to the lappers $t'$ $t^2$ $t^3$ $t^4$ by means of the bent levers $u'$ $u^2$ $u^3$ $u^4$, and the springs $t^*$, applied to their hinges, substantially as herein described.

8. The creasing-fingers $w$, arranged and operating substantially as herein described, to hold the blank in position and crease it in the line for folding the seal-flap, substantially as herein set forth.

9. The nippers $y$ $y'$, arranged and operating in a lateral direction, substantially as herein described, to remove the finished envelopes or bags at one side of the folding-stand.

10. The lifter 10, applied, substantially as herein described, to the folding-stand, and operated by the lever which carries the nippers $y$ $y'$, for the purpose of lifting the finished envelope or bag at one side thereof from the stand, to enable it to be taken by the nippers.

11. Applying a stamp, V, to work through the table C, substantially as described, for the purpose of stamping a card or other impression on a bag during the process of manufacture.

12. The general arrangement and combination of the several working parts of the machine, substantially as herein set forth.

13. The cutting and folding of the paper in such manner that the lap for closing the bottom of the bag, and a projection on one side of the mouth affording convenience for opening the bag and constituting a flap to cover the mouth, are both produced by the form of the cut by which the paper is cut from the roll, substantially as herein described, without any waste of paper, but I do not wish to be understood as now claiming the cutting off the paper in such form as to produce only the projection at one side of the mouth, that being claimed in the reissue dated September 4, 1860, of my Letters Patent of May 29, 1855.

E. W. GOODALE.

Witnesses:
E. H. DERBY,
H. T. GOODALE.